(12) United States Patent
Kim et al.

(10) Patent No.: US 7,492,750 B2
(45) Date of Patent: *Feb. 17, 2009

(54) METHOD AND APPARATUS EMPLOYED IN A USER EQUIPMENT FOR INTERFERENCE SIGNAL CODE POWER AND NOISE VARIANCE ESTIMATION

(75) Inventors: Younglok Kim, Seoul (KR); Jung-Lin Pan, Selden, NY (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 639 days.

This patent is subject to a terminal disclaimer.

(21) Appl. No.: 10/901,796

(22) Filed: Jul. 29, 2004

(65) Prior Publication Data

US 2005/0002356 A1 Jan. 6, 2005

Related U.S. Application Data

(63) Continuation of application No. 10/171,285, filed on Jun. 13, 2002, now Pat. No. 6,816,470.

(60) Provisional application No. 60/322,927, filed on Sep. 18, 2001.

(51) Int. Cl.
*H04J 3/00* (2006.01)

(52) U.S. Cl. .................. 370/342; 370/342; 370/281; 370/294; 375/346; 455/296

(58) Field of Classification Search .......... 370/280, 370/281, 342, 294; 375/346, 147
See application file for complete search history.

(56) References Cited

U.S. PATENT DOCUMENTS

| | | | |
|---|---|---|---|
| 5,263,033 A | 11/1993 | Seshadri | |
| 5,278,871 A | 1/1994 | Rasky et al. | |
| 5,606,580 A | 2/1997 | Mourot et al. | |
| 5,799,010 A * | 8/1998 | Lomp et al. | 370/335 |
| 6,144,710 A | 11/2000 | Chen et al. | |
| 6,144,711 A | 11/2000 | Raleigh et al. | |
| 6,339,612 B1 * | 1/2002 | Stewart et al. | 375/140 |
| 6,408,023 B1 * | 6/2002 | Abdesselem et al. | 375/232 |
| 6,731,700 B1 | 5/2004 | Yakhnich et al. | |
| 2005/0186933 A1 * | 8/2005 | Trans | 455/296 |

FOREIGN PATENT DOCUMENTS

| | | |
|---|---|---|
| EP | 0996113 | 4/2000 |
| JP | 07-154361 | 6/1995 |
| JP | 11-136212 | 5/1999 |
| JP | 2001-505723 | 4/2001 |
| JP | 2001-160982 | 6/2001 |
| JP | 2001-313588 | 11/2001 |
| JP | 2003-32168 | 1/2003 |
| JP | 2003-037581 | 2/2003 |
| JP | 2003-318779 | 11/2003 |
| KR | 2003-17193 | 3/2003 |
| WO | 98/09381 | 3/1998 |
| WO | 02/35745 | 5/2002 |

OTHER PUBLICATIONS

Luschi, Carlo et al. "Advanced Signal-Processing Algorithms for Energy-Efficient Wireless Communications", Proceedings of the IEEE, Oct. 2000, pp. 1633-1650.

Luschi, Carlo et al. "Advanced Signal-Processing Algorithms for Energy-Efficient Wireless Communications", Proceedings of the IEEE, Oct. 2000, pp. 1633-1650.

Third Generation Partnership Project, "Technical Specification Group Radio Access Network; Physical Channels and Mapping of Transport Channels onto Physical Channels (FDD) (Release 1999)," 3GPP TS 25.221 v3.2.0 (Mar. 2000).

Third Generation Partnership Project, "Technical Specification Group Radio Access Network; Physical Channels and Mapping of Transport Channels onto Physical Channels (FDD) (Release 1999)," 3GPP TS 25.221 v3.7.0 (Jun. 2001).

Third Generation Partnership Project, "Technical Specification Group Radio Access Network; Physical Channels and Mapping of Transport Channels onto Physical Channels (FDD) (Release 1999)," 3GPP TS 25.221 v3.11.0 (Sep. 2002).

Third Generation Partnership Project, "Technical Specification Group Radio Access Network; Physical Channels and Mapping of Transport Channels onto Physical Channels (FDD) (Release 4)," 3GPP TS 25.221 v4.1.0 (Mar. 2000).

Third Generation Partnership Project, "Technical Specification Group Radio Access Network; Physical Channels and Mapping of Transport Channels onto Physical Channels (FDD) (Release 4)," 3GPP TS 25.221 v4.7.0 (Dec. 2002).

Third Generation Partnership Project, "Technical Specification Group Radio Access Network; Physical Channels and Mapping of Transport Channels onto Physical Channels (FDD) (Release 5)," 3GPP TS 25.221 v5.5.0 (Mar. 2003).

Third Generation Partnership Project, "Technical Specification Group Radio Access Network; Physical Channels and Mapping of Transport Channels onto Physical Channels (FDD) (Release 6)," 3GPP TS 25.221 v6.1.0 (Mar. 2004).

* cited by examiner

*Primary Examiner*—Duc C Ho
(74) *Attorney, Agent, or Firm*—Volpe and Koenig, P.C.

(57) ABSTRACT

Method and apparatus employed by a UE for interference signal code power noise variance estimation employing a reduced number of samples utilizing the equation $$\hat{\sigma}_n^2 = T \cdot \sum_{i=1}^{N_{sample}} |h_{n(i)}|^2,$$

where $$T = \frac{G \cdot \gamma(r)}{N_{sample}},$$

where $$N_{sample} = L_{chest} - N_{pl} \cdot K_{max},$$

where $$\gamma(r) = \left[1 + \left(\frac{1}{r} - 1\right) \cdot \ln(1-r)\right]^{-1}$$

and where $$r = \frac{N_{sample}}{L_{chest}}.$$

As an alternative, a recursive technique may be employed wherein the noise variance is estimated from the ignored coefficients of the estimated channel output and upgraded recursively as per the following:

$$\hat{\sigma}_n^2 = \frac{1}{KW} \sum_{j=1}^{K} \sum_{i=1}^{W} \left| h_i^{(j)} - \hat{h}_i^{(j)} \right|^2,$$

where $\hat{h}_i^{(j)}$ are the channel estimates after the post processing and the noise variance estimates $\hat{\sigma}_{n-1}^2$, and the initial values of $\hat{h}_i^{(j)}$ are all zeros.

20 Claims, 5 Drawing Sheets

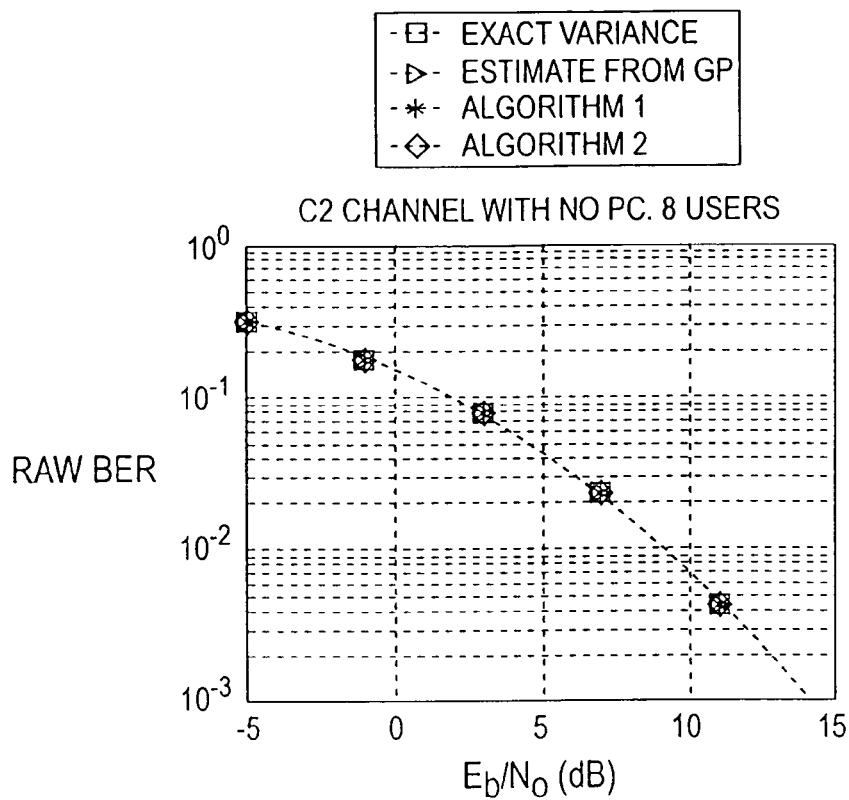
FIG. 4a
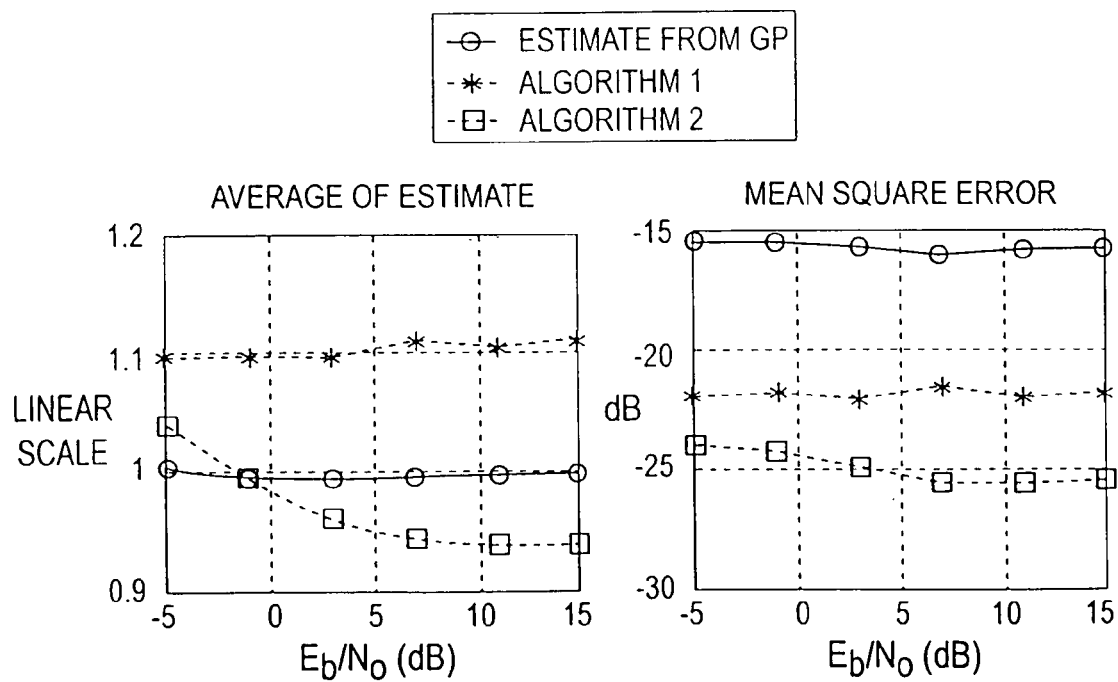
FIG. 4b   FIG. 4c

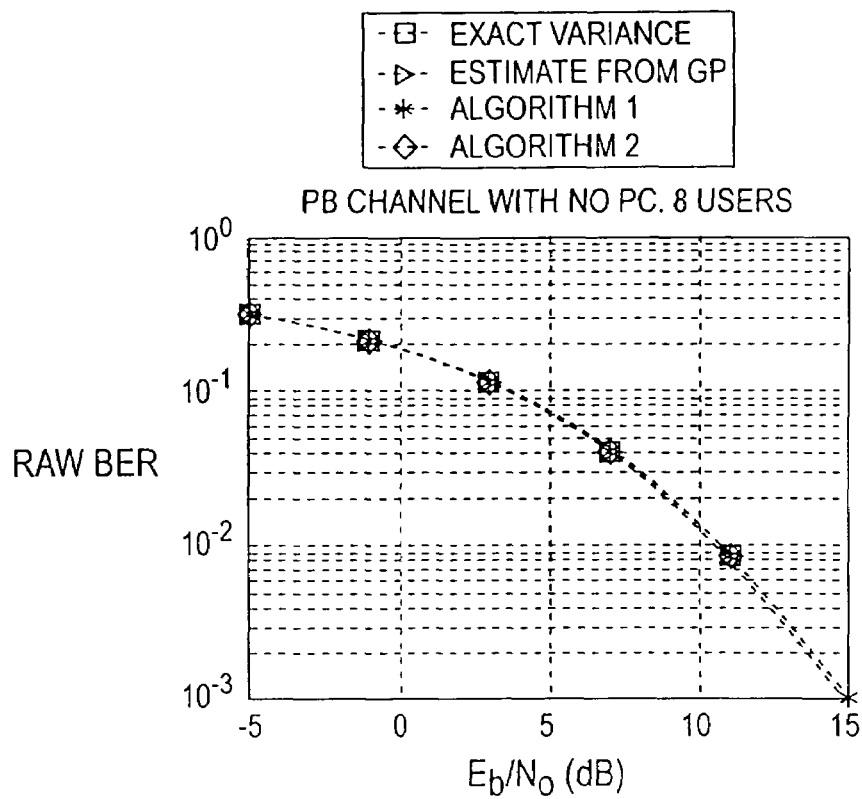
FIG. 5a
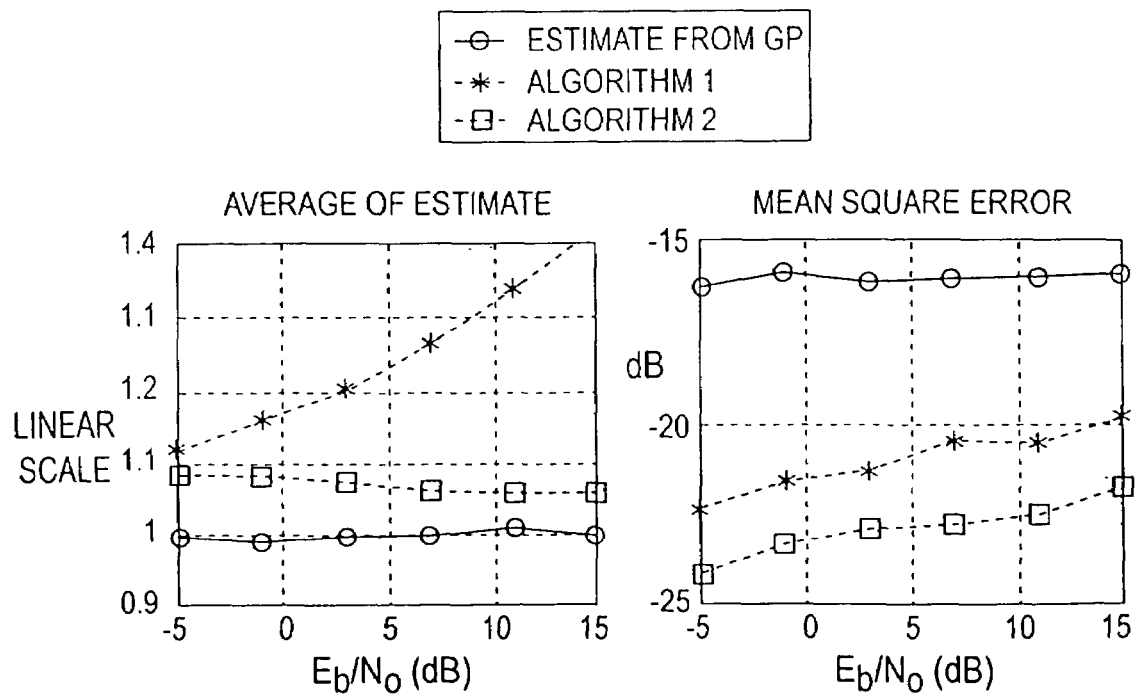
FIG. 5b
FIG. 5c

METHOD AND APPARATUS EMPLOYED IN A USER EQUIPMENT FOR INTERFERENCE SIGNAL CODE POWER AND NOISE VARIANCE ESTIMATION

CROSS REFERENCE TO RELATED APPLICATION

This application is a continuation of U.S. patent application Ser. No. 10/171,285, filed Jun. 13, 2002 now U.S. Pat. No. 6,816,470, which in turn claims priority from 60/322,927, filed Sep. 18, 2001 which are incorporated by reference as if fully set forth.

BACKGROUND

The present invention is generally related to wireless time division duplex (TDD) or frequency division duplex (FDD) communication systems. More particularly, the present invention is related to UE in a TDD communication system which implements an estimation method for interference signal code power (ISCP) and noise variance using a partial sample averaging.

In a UMTS terrestrial radio access TDD system, the estimation of ISCP and noise variance has become increasingly important. The receiver design requires an estimate of the noise variance for the post processing of the channel estimation and minimum mean square error-block linear equalization (MMSE-BLE) algorithm used by multi-user detection (MUD). In addition, the dynamic channel assignment dynamic channel allocation (DCA) and timeslot allocation relies on an accurate estimate of interference signal code power (ISCP) as well. As defined in the 3GPP TS25.225, the measurement "timeslot ISCP" is only a measure of the intercell interference. Because intercell interference can be treated as white Gaussian noise, the estimates of ISCP and noise variance can be combined into one step. A prior estimation method uses the chip sequence in the guard period. However, due to the timing advance and the length of delay spread, there are not a sufficient number of chips in the guard period available for performing the estimation.

SUMMARY

The present invention provides a background noise power estimator employed in a UE and using the estimated coefficients of the channel impulse responses.

BRIEF DESCRIPTION OF THE DRAWINGS

FIG. 3 is an estimated noise variance sequence normalized by the actual noise variance. Working group 4 (WG4) case 2 (slow fading) at 3 dB Eb/No.

FIG. 4(a) shows Raw BER curves, FIG. 4(b) shows the normalized average of the estimated noise variance and FIG. 4(c) shows the Mean square error of the estimates normalized by the actual variance. Algorithm 1 is utilized with 30 samples, and algorithm 2 is utilized with 6 recursions in working group 4 (WG4) channel case 2 (slow fading).

FIG. 5(a) shows the raw BER curves, FIG. 5(b) shows the normalized average of the estimated noise variance and FIG. 5(c) shows the Mean square error of the estimates normalized by the actual variance. Algorithm 1 with 30 samples, and algorithm 2 with 6 recursions in International Telecommunication Union (ITU) pedestrian B channel case.

DETAILED DESCRIPTION OF THE PREFERRED EMBODIMENTS

In the present invention, an estimation method of ISCP and noise variance using the output information of the channel estimator is used. The method overcomes the problems of prior art estimation methods and offers much better accuracy in estimates used by dynamic channel allocation (DCA) and multi-user detection (MUD). In particular, an algorithm of partial sample averaging is used to realize the computation.

Figure 3A:
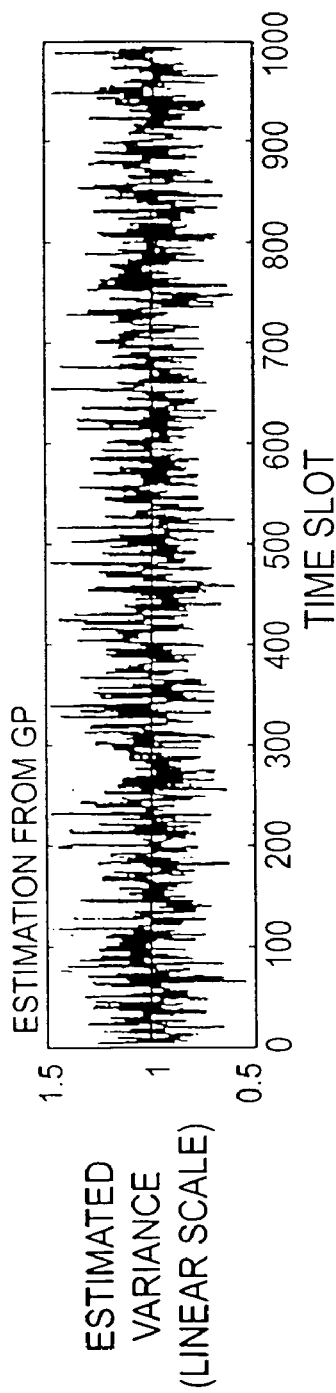
FIG. 3a shows the estimation from the guard period (GP) and FIGS. 3b and 3c show the estimated noise variance respectively employing algorithm 1 and 2.
Figure 3B:
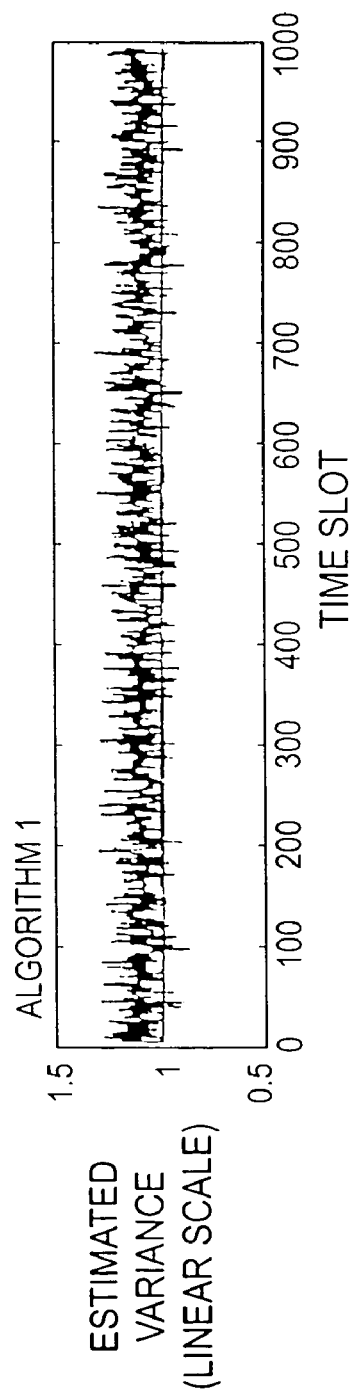
Figure 3C:
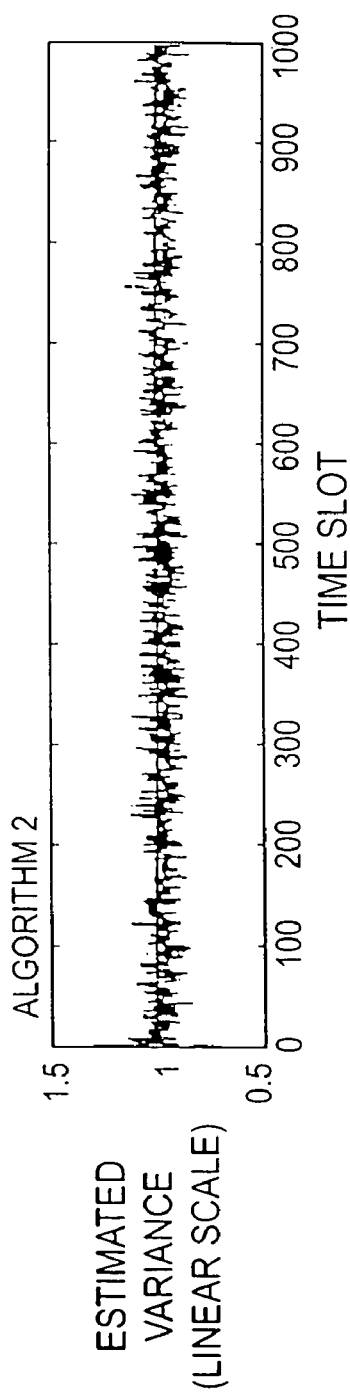

Although the present inventive method of estimation of ISCP and noise variance is based on a WCDMA TDD system, the algorithm can be applied to all kinds of communications systems using the information of estimated channel response, including WCDMA FDD systems. FIGS. 3b and 3c show the noise variance estimations employing algorithms 1 and 2 of the present invention compared with the noise variance obtained from the guard period (GP).

The following is a description of the signal model for Steiner channel estimation. Let $K_{max}$ be the maximum number of distinct midambles allowed by one basic midamble code. Then $K_{max}$=16, 8 or 4 for burst type 1 and $K_{max}$=6 or 3 for burst type 2. The signal model for a received sequence is represented by:

$$\underline{r} = G\underline{h} + \underline{n} = [G1 | G2 | \cdots | GK] \begin{bmatrix} \underline{h}^{(1)} \\ \underline{h}^{(2)} \\ \vdots \\ \underline{h}^{(K)} \end{bmatrix} + n \quad \text{Equation (1)}$$

and the maximum-likelihood estimate (MLE) is given by:

$$\hat{h}=(G^H G)^{-1} G^H r = h+w, \quad \text{Equation (2)}$$

where:

$$w=(G^H G)^{-1} G^H n. \quad \text{Equation (3)}$$

In the case when the active midamble shifts are exactly known, (uplink or downlink with a common midamble shift), the number of block columns of matrix G and the interference can be reduced. However, there is no performance gain as can be seen from a comparison of the maximum midamble shifts ($K_{max}$) and the active midamble shifts ($K_{active}$). In fact, the complexity of the system is increased since the coefficients of the pseudo inverse matrix must to be computed per every timeslot. Assuming the maximum number of midambles, they will be computed only once after the cell specification.

Moreover, the output sequence with no signal component is useful for the ISCP and noise variance estimation even in the case of a known midamble. Hence the channel estimator is desired to provide $K_{max}$ number of channel estimates no matter how many midambles are active.

The following describes the proposed estimation method for ISCP and noise variance in accordance with the present invention. The chip length of the output sequence of the channel estimator is always $K_{max}W$, where W is the length of the channel impulse response. Most of the output sequences comprise only the ISCP and a noise component, and a few include the signal and a noise component. When the active midambles are known, the estimation can be easily obtained from the channel estimates for the inactive midambles. However, for the cases of uplink and downlink with a common midamble where the midambles are unknown, estimation becomes problematic. The forgoing description is directed to downlink channels with multiple midambles where the active midambles are unknown.

The ISCP and noise variance will be referred to, for simplicity, as the noise variance for algorithm 1, partial sample average, the probability density function of the amplitude of the complex noise is a Rayleigh function represented by:

$$f(x) = \frac{2x}{\sigma_w^2} \exp\left(-\frac{x^2}{\sigma_w^2}\right) U(x); \qquad \text{Equation (4)}$$

where $\sigma_w^2$ is its variance.

The goal is to estimate the variance from the smallest number of samples. The average of the estimate and the mean square error both decrease with an increasing number of samples as shown in FIG. 3. Obviously, the average of the sample power does not converge to the ensemble average power. Rather, when the smallest N out of W samples are used, the sample variance will converge to the second moment represented by:

$$\sigma_a^2 = \int_{x=0}^{a} x^2 f(x) \, dx; \qquad \text{Equation (5)}$$

where a satisfies $$Pr\{x < a\} = \frac{N}{W}.$$

After a short derivation, $$a = \sqrt{-\sigma_w^2 \ln\left(1 - \frac{N}{W}\right)}, \qquad \text{Equation (6)}$$

and the ensemble average power of smallest N out of W samples converge to:

$$\sigma_a^2 = c\sigma_w^2; \qquad \text{Equation (7)}$$

where:

$$c = \frac{N}{W} + \left(1 - \frac{N}{W}\right) \cdot \ln\left(1 - \frac{N}{W}\right). \qquad \text{Equation (8)}$$

Figure 1:
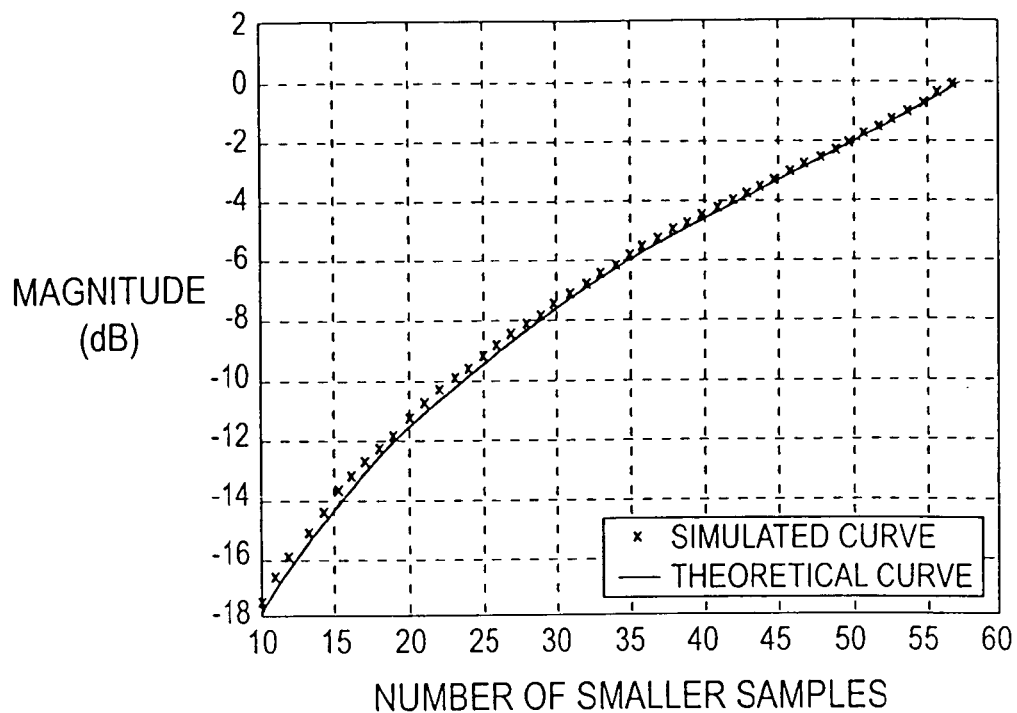
FIG. 1 is a theoretical ensemble average power of the truncated Rayleigh distributed random variable and the numerical average of the sample power with respect to the number of smaller samples out of W=57 chips of each channel estimate, and showing the simulated curve and the theoretical curve.
Figure 2:
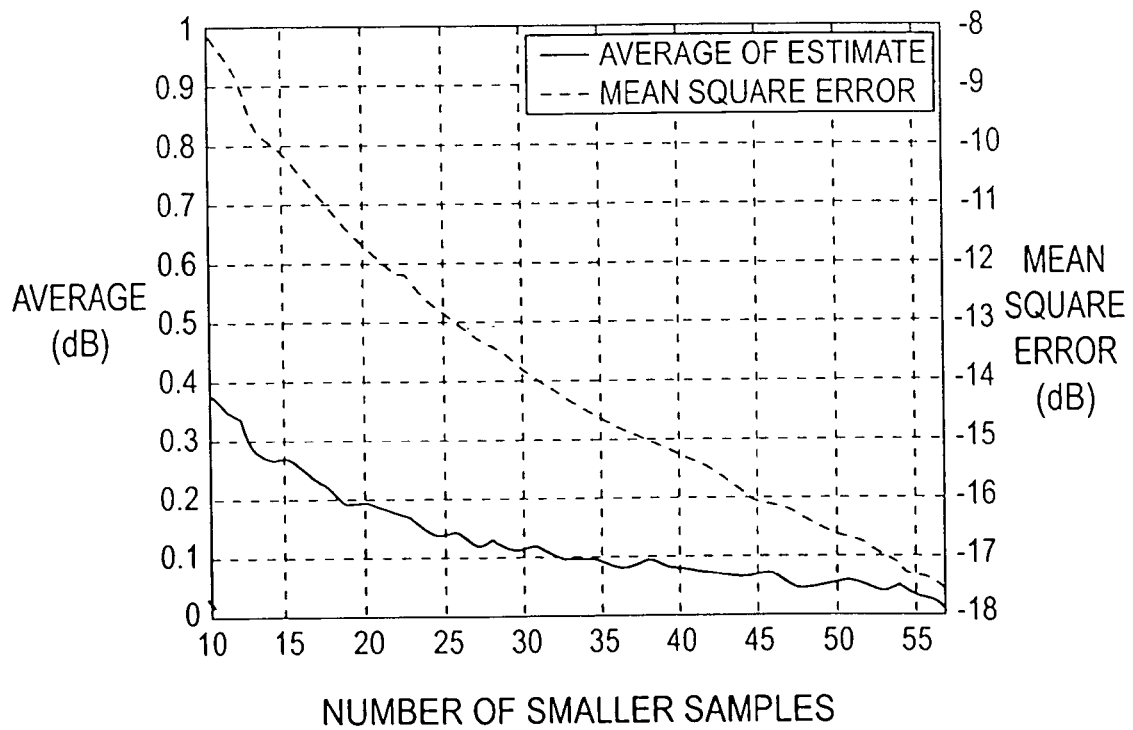
FIG. 2 is a plot showing the average and mean square error of the estimated noise variance using the algorithm 1 and normalized by the actual noise variance. 10,000 independent simulations are averaged.

Hence, the scaling factor c is a function of the ratio N/W. The theoretical and numerical scaling factors with respect to N are shown in FIG. 1 in the situation of burst type 1 and W=57.

Using this scaling factor, the noise variance estimate from the N smallest samples out of W becomes:

$$\hat{\sigma}_w^2 = \frac{1}{cKN} \sum_{j=1}^{K} \sum_{i=1}^{N} |h_i^{(j)}|^2, \qquad \text{Equation (9)}$$

where $h_i^{(j)}$, i=1,2, ... , W are in the order of ascending amplitudes.

The foregoing describes the parameters for the estimation method of noise variance, as well as those used by channel estimation. The estimation method will be described at the system level and with the help of some system parameters. The system parameters include the following:

W: Channel length.

$K_{max}$: Maximum number of midamble shifts.

P: Length of the basic midamble code, which is the length of the input of the channel estimation block.

$L_m$: Length of midamble code.

$L_{chest}$: Output length of the channel estimator. It is not necessarily equal to $W \cdot K_{max}$ especially for the burst type 1 extended midamble case.

$h_i$, i=1, 2, ... , $L_{chest}$: Estimated joint channel coefficients.

$K_{active}$: Active number of midamble shifts.

$N_{p1}$: Maximum number of paths per channel.

$N_{p2}$: Actual number of paths per channel.

The specifications and the relations of the above parameters are summarized in Table 1:

TABLE 1

| Burst structure | Burst type 1 or 3 P = 456, $L_m$ = 512 | | Burst type 2 P = 192, $L_m$ = 256 | |
|---|---|---|---|---|
| $K_{max}$ | 16 | 8 | 4 | 6 | 3 |
| W | 28 or 29* | 57 | 57 | 32 | 64 |
| $L_{chest}$ | 456 | 456 | 456 | 192 | 192 |

*W = 28 for even midamble number and W = 29 for odd number.

Figure 6:
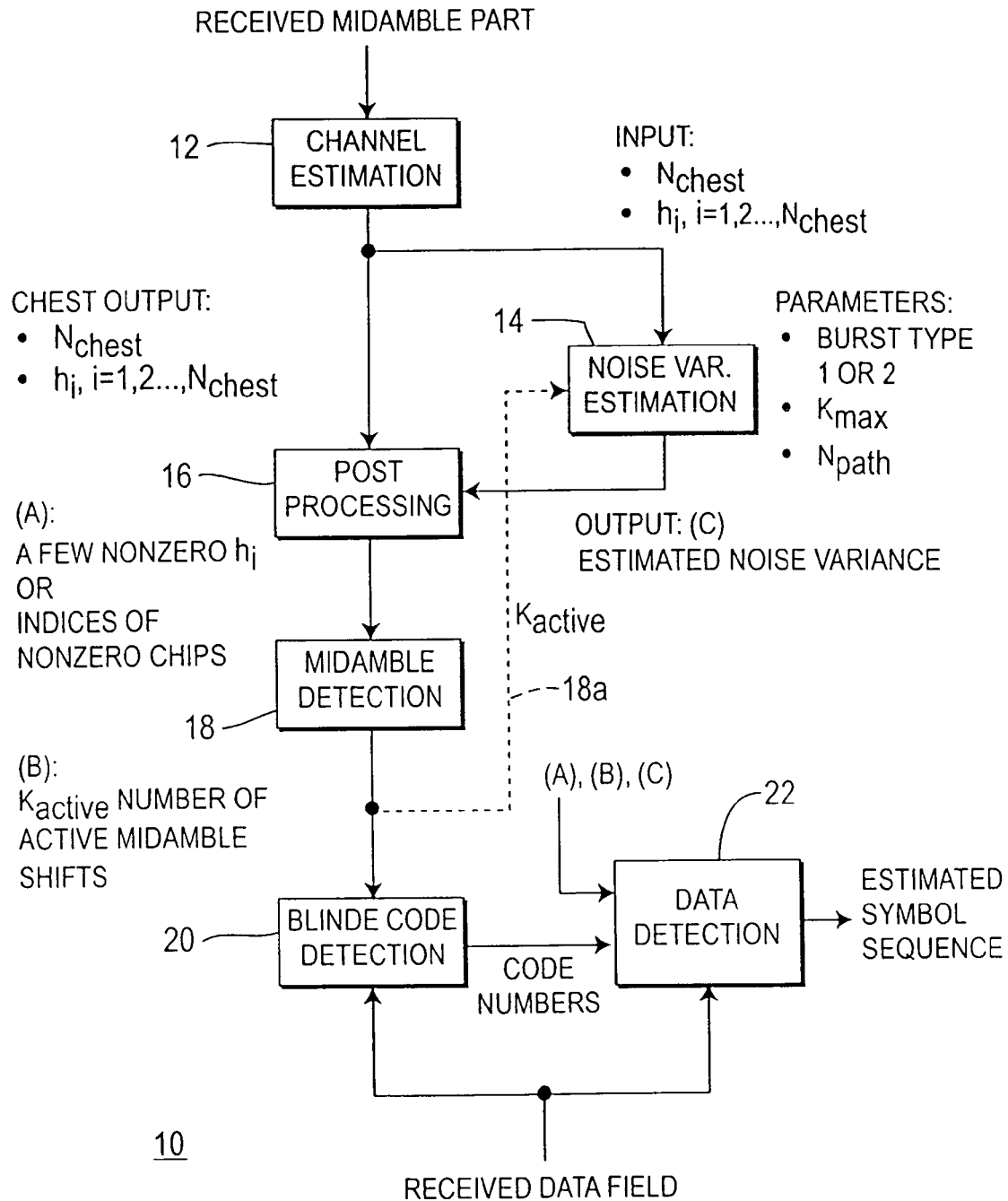
FIG. 6 is a block diagram of channel estimation and post processing for a UE receiver showing the manner in which noise variance estimator obtained in accordance with the method and apparatus of the present invention is employed.

The location of the ISCP and noise variance estimation block 14 at user equipment (UE) 10 is shown in FIG. 6. In the uplink, midamble detection 18 and blind code detection 20 blocks are not required since they are already known at the BS receiver. The downlink noise estimation will use $K_{max}$ instead of $K_{active}$ since the active number of midambles is not known and it will be estimated by the midamble detection. The information of the number of active midambles optionally can be fed back to noise (ISCP) estimation block 14, from midamble 18, through path 18a, but results in a processing delay with little gain in the overall detection performance.

Here, the proposed estimation algorithm, using a partial sample average, is summarized as follows:

$$\hat{\sigma}_n^2 = G \cdot \gamma(r) \cdot \frac{1}{N_{sample}} \cdot \sum_{i=1}^{N_{sample}} |h_{n(i)}|^2 \quad \text{Equation (10)}$$

where:

$$N_{sample} = L_{chest} - N_{pl} \cdot K_{active}, \quad \text{Equation (11)}$$

$$\gamma(r) = \left[1 + \left(\frac{1}{r} - 1\right) \cdot \ln(1-r)\right]^{-1}, \quad \text{Equation (12)}$$

$$r = \frac{N_{sample}}{L_{chest}}: \text{sample ratio}, \quad \text{Equation (13)}$$

G=400 for burst types 1 and 3, and,
G=169 for burst type 2.

n(i), i=1, 2, . . . ,: Lchest is the index of I-th smallest coefficient, (i.e., $h_{n(i)}$, i=1, 2, . . . $L_{chest}$) which are in the order of ascending amplitude. To simplify the implementation, the constant values can be fixed for each case as shown in Table 2, which shows the scaling constant T with respect to the timeslot configurations; where P is the number of available samples, and those numbers marked with a double asterisk may not be assumed in practice. Here the constant T is defined by:

$$T = \frac{G \cdot \gamma(r)}{N_{sample}}, \quad \text{Equation (14)}$$

and the estimated noise variance becomes $$\hat{\sigma}_n^2 = T \cdot \sum_{i=1}^{N_{sample}} |h_{n(i)}|^2. \quad \text{Equation (15)}$$

TABLE 2

|  | $K_{max}$ | N pl = 6 | | N pl = 10 | |
| --- | --- | --- | --- | --- | --- |
|  |  | N samples | T | N samples | T |
| Burst | 4 | 432** | 1.1** | 411 | 1.3 |
| Type 1 | 8 | 411 | 1.3 | 375 | 1.7 |
| P = 456 | 16 | 360 | 1.9 | 296** | 3.1** |
| Burst | 3 | 174 | 1.3 | 158 | 1.7 |
| Type 2 | 6 | 158 | 1.7 | 132** | 2.7** |
| P = 192 |  |  |  |  |  |

As an alternative, noise variance is estimated from the ignored coefficients of the estimated channel output and upgraded recursively as per the following:

$$\hat{\sigma}_n^2 = \frac{1}{KW} \sum_{j=1}^{K} \sum_{i=1}^{W} |h_i^{(j)} - \hat{h}_i^{(j)}|^2,$$

where $\hat{h}_i^{(j)}$ are the channel estimates after the post processing with the noise variance estimates $\hat{\sigma}_{n-1}^2$, and the initial values of $\hat{h}_i^{(j)}$ are all zeros.

The number of recursions is six (6) in the simulation, which can be reduced depending on the propagation channel condition.

An example simulation will now be explained. The following is a list of assumptions and parameters used for the present example:
Burst type 1.
W=57.
8 data bursts with spreading factor (SF)=16.
8 distinct midambles.
WG4 case 2 and ITU pedestrian B channel cases.
30 samples for algorithm 1.
6 recursions for the algorithm 2.

The MMSE-BLE performances according to the different schemes are very similar as shown in FIG. 4(*a*) and FIG. 5(*a*). Hence, the data detection performance is not so sensitive to the estimation error normalized by the actual noise variance shown in FIG. 4(*c*) and FIG. 5(*c*). The conclusions obtained are:

The variance estimate by Algorithm 1 is biased to a little higher value especially with higher SNR and with more multipaths, which can be observed from FIG. 5(*b*) and 6(*b*).

Algorithm 2 has the best performance but the multiple threshold tests have to be performed for the post processing. The complexity increase is dependent on the number of iterations and the complexity of the comparisons.

If the noise variance is only for MMSE-BLE and post processing, then algorithm 1 is sufficient for most wireless situations. However, when more accurate noise variance estimation is required where the overall communication system performance is much more sensitive to noise variance estimation error, then algorithm 2 will be the best choice.

What is claimed is:

1. A method for estimating noise variance, the method comprising:

performing channel estimation on a midamble portion of a received burst to obtain a plurality of channel coefficients where active midambles are not known; and estimating noise variance based on equation $$\hat{\sigma}_n^2 = T \cdot \sum_{i=1}^{N_{sample}} |h_{n(i)}|^2,$$

where $$T = \frac{G \cdot \gamma(r)}{N_{sample}}, r = \frac{N_{sample}}{L_{chest}},$$

$N_{sample} = L_{chest} - N_{pl} \cdot K_{max}$, $h_{n(i)}$, (i=1,2,. . .,$L_{chest}$), represents channel coefficients, $L_{chest}$ is an output length of the channel estimation, $N_{pl}$ is a maximum number of paths per channel, $K_{max}$ is a maximum number of midamble shifts, n(i) is an index of i-th smallest estimated channel coefficient, G is a burst-dependent constant, $$\gamma(r) = \left[1 + \left(\frac{1}{r} - 1\right) \cdot \ln(1-r)\right]^{-1},$$

and i is an index.

2. The method of claim 1 wherein, when the received burst is burst type 1, G is set to 400.

3. The method of claim 1 wherein, when the received burst is burst type 2, G is set to 169.

4. The method of claim 1 wherein, when the received burst is burst type 3, G is set to 400.

5. The method of claim 1 comprising obtaining the scaling constant T from a look-up table, wherein T increases with an increasing value of midamble shifts.

6. The method of claim 5 wherein the scaling constant is selected in accordance with permissible midamble shifts which are 4, 8 and 16, when the received burst is burst type 1.

7. The method of claim 5 wherein the scaling constant is selected in accordance with permissible midamble shifts which are 3 and 6, when the received burst is burst type 2.

8. A user equipment (UE) for estimating noise variance, the UE comprising:
   a channel estimator for performing a channel estimation on a midamble portion of a received burst to obtain a plurality of channel coefficients where active midambles are not known; and
   a noise variance estimator for estimating noise variance based on equation $$\hat{\sigma}_n^2 = T \cdot \sum_{i=1}^{N_{sample}} |h_{n(i)}|^2,$$

where $$T = \frac{G \cdot \gamma(r)}{N_{sample}}, \quad r = \frac{N_{sample}}{L_{chest}},$$

$N_{sample} = L_{chest} - N_{pl} \cdot K_{max}$, where $h_{n(i)}$, (i=1,2,..., $L_{chest}$), represents channel coefficients, $L_{chest}$ is an output length of the channel estimator, $N_{pl}$ is a maximum number of paths per channel, $K_{max}$ is a maximum number of midamble shifts, n(i) is an index of i-th smallest coefficient in the channel estimation, G is a burst constant, $$\gamma(r) = \left[1 + \left(\frac{1}{r} - 1\right) \cdot \ln(1-r)\right]^{-1},$$

and i is an index.

9. The UE of claim 8 wherein, when the received burst is burst type 1, G is set to 400.

10. The UE of claim 8 wherein, when the received burst is burst type 2, G is set to 169.

11. The UE of claim 8 wherein, when the received burst is burst type 3, G is set to 400.

12. The UE of claim 8 wherein the scaling constant T is obtained from a look-up table, wherein T increases with an increasing value of midamble shifts.

13. The UE of claim 12 further comprising a scaling constant selector for selecting the scaling constant in accordance with permissible midamble shifts which are 4, 8 and 16, when the received burst is burst type 1.

14. The UE of claim 12 further comprising a scaling constant selector for selecting the scaling constant in accordance with permissible midamble shifts which are 3 and 6, when the received burst is a burst type 2.

15. The UE of claim 8 wherein the noise variance estimator utilizes the number of active midamble shifts for revising the noise variance estimation.

16. A method for estimating noise variance, the method comprising:
   (a) performing a channel estimation on a midamble portion of a received burst, where active midambles are not known, to obtain a plurality of channel impulse responses; and
   (b) recursively estimating noise variance based on equation;

$$\hat{\sigma}_n^2 = \frac{1}{KW} \sum_{j=1}^{K} \sum_{i=1}^{W} \left| h_i^{(j)} - \hat{h}_i^{(j)} \right|^2,$$

where $\hat{h}_i^{(j)}$ are channel estimates after post processing with the noise variance estimates $\hat{\sigma}_{n-1}^2$, and initial values of $\hat{h}_i^{(j)}$ are all zeros.

17. The method of claim 16 wherein six (6) recursions are performed during step (b).

18. The method of claim 17 wherein the noise variance is estimated from ignored co-efficients of the estimated channel impulse responses.

19. A user equipment (UE) for estimating noise variance, the UE comprising:
   a channel estimator for performing a channel estimation on a midamble portion of a received burst, where active midambles are not known, to obtain a plurality of channel impulse responses; and
   a noise variance estimator for recursively estimating noise variance based on the equation:

$$\hat{\sigma}_n^2 = \frac{1}{KW} \sum_{j=1}^{K} \sum_{i=1}^{W} \left| h_i^{(j)} - \hat{h}_i^{(j)} \right|^2,$$

where $\hat{h}_i^{(j)}$ are channel estimates after post processing with the noise variance $\hat{\sigma}_{n-1}^2$, and initial values of $\hat{h}_i^{(j)}$ are all zeros, the noise variance being estimated from ignored coefficients of the estimated channel output and upgraded recursively.

20. A UE according to claim 19 wherein the noise variance estimator performs six (6) recursions.

* * * * *

UNITED STATES PATENT AND TRADEMARK OFFICE
CERTIFICATE OF CORRECTION

PATENT NO. : 7,492,750 B2  Page 1 of 1
APPLICATION NO. : 10/901796
DATED : February 17, 2009
INVENTOR(S) : Kim et al.

It is certified that error appears in the above-identified patent and that said Letters Patent is hereby corrected as shown below:

Title Page, item (56), OTHER PUBLICATIONS, page 1, right column, line 22, after "v4.1.0" delete "(Mar. 2000)" and insert therefor --(Jun. 2001)--.

Item (56), OTHER PUBLICATIONS, page 2, left column, line 8, after "v5.5.0" delete "(Mar. 2003)" and insert therefor --(Jun. 2003)--.

Item (56), OTHER PUBLICATIONS, page 2, left column, line 12, after "v6.1.0" delete "(Mar. 2004)" and insert therefor --(Jun. 2004)--.

At column 2, delete Equation (2), and insert therefor -- $\hat{\underline{h}} = (G^H G)^{-1} G^H \underline{r} = \underline{h} + \underline{w}$, --.

At column 2, delete Equation (3), and insert therefor -- $\underline{w} = (G^H G)^{-1} G^H \underline{n}$.--.

At column 2, line 65, before the words "be computed" delete "to".

At column 5, line 21, before the words "is the index" delete "n(i), i=1, 2, ... ,:Lchest" and insert therefor --n(i), i=1, 2, ... ,:$L_{chest}$--.

At claim 8, column 7, line 42, before the word "constant" delete "burst" and insert therefor --burst-dependent--.

Signed and Sealed this

Sixteenth Day of June, 2009

JOHN DOLL
*Acting Director of the United States Patent and Trademark Office*